455-603 AU 233 EX
FP8106 XR 3,371,232 5006Y
[redacted]
2
ITUTE FOR MISSING XR

Feb. 27, 1968 W. J. HANNAN ET AL 3,371,232

HIGH CURRENT, SHORT DURATION PLUSE GENERATOR

Filed Feb. 21, 1966

Inventors:
WILLIAM J. HANNAH & DAINIS KARLSONS
BY Edward J Norton
Attorney

3371232
OR IN 307/312

United States Patent Office 3,371,232
Patented Feb. 27, 1968

3,371,232

HIGH CURRENT, SHORT DURATION PULSE GENERATOR

William J. Hannan, Moorestown, and Dainis Karlsons, Camden, N.J., assignors to Radio Corporation of America, a corporation of Delaware Filed Feb. 21, 1966, Ser. No. 528,885
7 Claims. (Cl. 307—312)

This invention relates to pulse generators and more particularly to an improved pulse generator for supplying high current, short duration pulses.

There are various applications which require a source of high current, short duration pulses. For example, the operation of an injection laser diode circuit usually involves the driving of the injection laser diode with short, high current pulses. Typical drive requirements are 40 amps, 100 nanosecond pulses at repetition rates as high as 20 kc. This is typically accomplished by charging a capacitor to the supply voltage through a resistor and then discharging the capacitor through the laser diode at the desired repetition rate. In this operation, up to half of the power available to drive the laser diode is in effect wasted, particularly when the power spent in charging the capacitor is considered. Such an operation is therefore inefficient.

An object of the present invention is to provide an improved high current, short duration pulse generator which delivers power to a load with an efficiency which is double that of previously available pulse generators thereby reducing the primary power requirement in the use of such generators by a factor of two.

Another object is to provide an improved high current short duration pulse generator for use with injection laser diode devices.

Briefly, in accordance with one embodiment of the invention to be described, first and second semiconductor diodes are connected in series across a load, for example, a laser diode, with unlike electrodes being connected directly together. A voltage supply is provided having a positive and a negative terminal. One terminal of a capacitor is connected to the junction of the first and second diodes, and the capacitor's other terminal is connected to the electrical midpoint of the voltage supply. Switching means are provided for alternately connecting first the positive terminal of the voltage supply to one terminal or side of the laser diode and then the negative terminal of the voltage supply to the other terminal or side of the laser diode, causing the first and second diodes to conduct alternately and direct current flow so that the capacitor is both charged and discharged through the laser diode.

Figure 1:
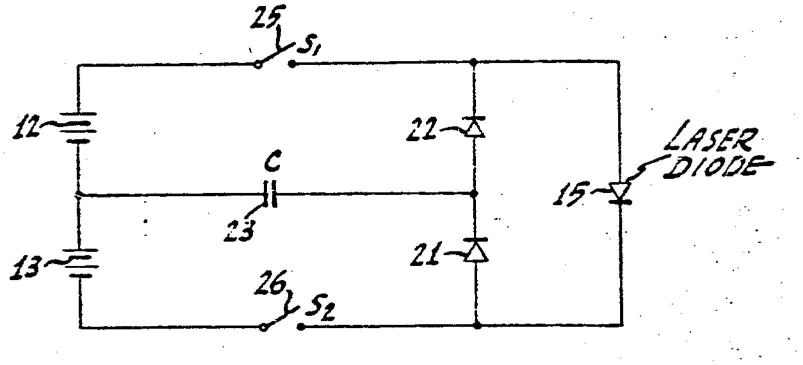
Figure 2:
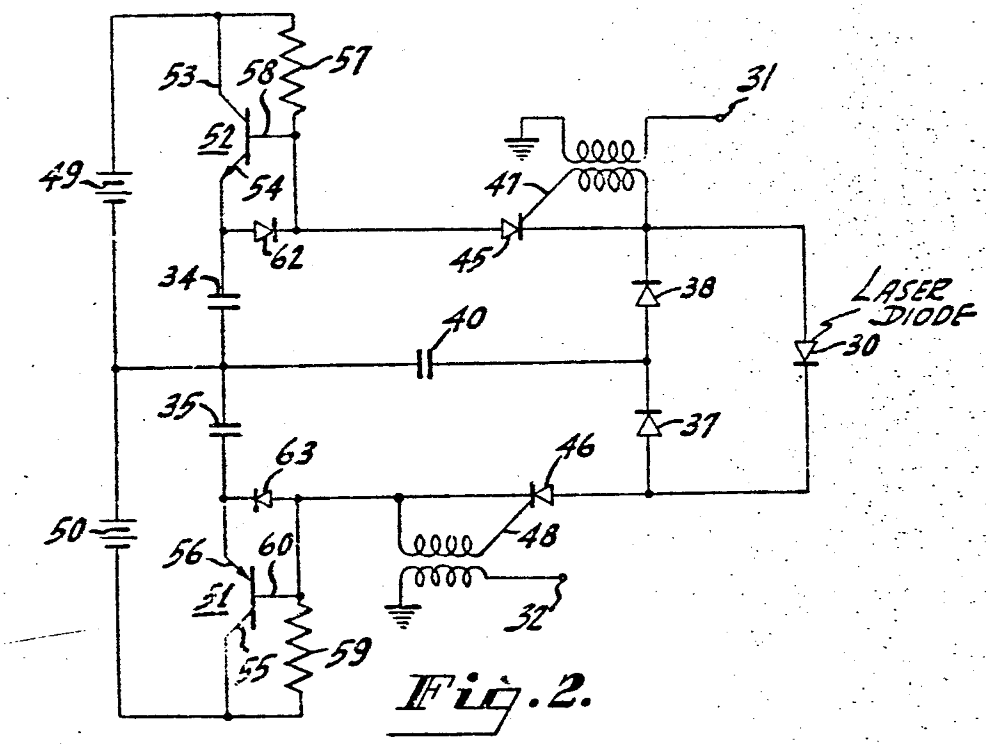

A more detailed description will now be given in conjunction with the accompanying drawing, in which:

FIG. 1 is a schematic diagram of a pulse generator for driving an injection laser diode according to one embodiment of this invention, and FIG. 2 is a schematic diagram of a further embodiment of this invention employing silicon controlled rectifier switches.

Referring to FIG. 1 a first source of unidirectional potential shown as a battery 12 is connected in series with an equal valued source of unidirectional potential shown as a battery 13. The negative terminal of the voltage supply 12 is connected to the positive terminal of voltage supply 13. A laser diode 15 is provided having a cathode and an anode terminal. Diodes 21, 22 are connected in series across the laser diode 15. The anode terminal of diode 21 is connected to the cathode terminal of laser diode 15. The cathode terminal of diode 21 is connected to the anode terminal of diode 22. The cathode terminal of diode 22 is connected to the anode terminal of laser diode 15. One terminal of a capacitor 23 is connected to the junction of series-connected voltage sources 12, 13, and the other terminal of capacitor 23 being connected to the junction of diodes 21, 22. The anode terminal of laser diode 15 is connected to the positive terminal of voltage source 12 through a first switch 25, and the cathode terminal of laser diode 15 is connected to the negative terminal of voltage source 13 through a second switch 26. External means, not shown, are provided for first opening switch 25 and closing switch 26 and then opening switch 26 and closing switch 25.

When switch 25 is closed and switch 26 is open, current flows through laser diode 15 and diode 21 charging capacitor 23 in one direction to a positive voltage equal to the supply voltage 12 or half the voltage across series-connected voltage sources 12, 13 ($+E/2$). Likewise, when switch 26 is closed and switch 25 is open, current flows through laser diode 15 and diode 22 charging capacitor 23 in the opposite direction to a negative voltage equal to the supply voltage 13 or half the voltage across series-connected voltage sources 12, 13 ($-E/2$). When switches 25, 26 are closed alternately in the manner described above for a time period sufficient to allow capacitor 23 to charge to the supply voltages 12 and 13, respectively, diodes 21, 22 direct the current flow such that capacitor 23 is both charged and discharged through the laser diode 15. The timing cycle, the value of capacitor 23 and other parameters can be determined so that a train of short duration, high current pulses are supplied to the laser diode as required. Since a pulse is delivered to the laser diode 15 for both the charge and discharge times of the capacitor 23, the efficiency is improved two to one over prior art arrangements wherein a pulse is delivered only for the capacitor discharge time.

Silicon controlled rectifiers provide excellent switching devices for high speed switching and accordingly may be used as switches 25, 26 described above with suitable control circuitry, not shown. These devices can switch current as high as 100 amps in less than 40 nanoseconds. However, an undesirable characteristic of these devices is that once turned on they remain on even if their gate is subsequently reversed biased. Another undesirable characteristic in this application is that the internal capacitance of these devices makes them susceptible to accidental turn-on by transients from the power supply. If the switches 25, 26 are silicon controlled rectifier switches and happen to be turned on simultaneously such as by a power supply transient, the power supply could be shorted through the laser diode 15 causing considerable damage. Automatic protection against accidental turn-on of both rectifier switches is provided by the embodiment shown below in FIG. 2.

FIG. 2 shows a schematic diagram of a push-pull drive circuit using silicon controlled rectifier switches and using an automatic protection circuit against accidental turn-on of both switches. A laser diode 30 is provided having an anode and a cathode terminal. Diodes 37, 38 are connected in series across laser diode 30 so that the cathode of diode 37 is directly connected to the anode of diode 38. The cathode of laser diode 30 is connected to the anode of diode 37, and the anode of laser diode 30 is connected to the cathode of diode 38. A first source of unidirectional potential or battery 49 is connected in series with an equal valued source of unidirectional potential or battery 50 with the positive terminal of supply voltage 50 being connected to the negative terminal of supply voltage 49. Capacitors 34, 35 are connected in series. An NPN emitter-follower transistor 52 is connected so that the collector 53 is connected to the positive terminal of supply voltage 49 and so that the emitter 54 is connected to one side of capacitor 34. A PNP emitter-follower transistor is connected so that the collector 55 is connected to the negative terminal of supply voltage 50 and so that the emitter 56 is connected to one side of capacitor 35. The junction of series connected voltage sources 49, 50 is connected to the junction of capacitor 34, 35 and to one terminal or side of capacitor 40. The opposite terminal of capacitor 40 is connected to the junction of diodes 37 and 38. The base-to-collector bias of transistor 52 is provided by resistor 57 which is connected between collector 53 and base 58. The base-to-collector bias of transistor 51 is provided by resistor 59 which is connected between base 60 and collector 55. A diode 62 is connected in series with a silicon controlled rectifier switch 45 whereby the anode of diode 62 is connected to the emitter of NPN transistor 52 and the cathode of diode 62 is connected to the base 58 of transistor 52 and the anode of switch 45. The cathode of silicon controlled rectifier switch 45 is connected to the anode of laser diode 30. A diode 63 is connected in series with silicon controlled rectifier switch 46 whereby the cathode of diode 63 is connected to the emitter 56 of PNP transistor 51 and the anode of diode 63 is connected to the base 60 of transistor 51 and the cathode of switch 46. The anode of switch 46 is connected to the cathode of laser diode 30.

A suitable source of high speed, short duration switching pulses, not shown, is connected to a pair of terminals 31, 32. The switching pulse source may be constructed in any known manner according to the operating frequency and other requirements of the application, and includes gating or other means for directing the switching pulses alternately to first the terminal 31 and then to the terminal 32. For example, the source of switching pulses may be a flip-flop to generate a train of square wave pulses with means for differentiating the pulses so produced to produce two pulse trains. The switching pulses may be one volt pulses occurring at the operating frequency desired for the laser diode 30, for example, 8 kc. The switching pulses applied to the terminal 31 are transformer coupled to the gate 47 of the rectifier switch 45, and the pulses applied to the terminal 32 are transformer coupled to the gate 48 of the rectifier switch 46.

In operation, capacitor 34 charges to the voltage of the supply 49 by conduction of transistor 52. Capacitor 35 charges to the voltage of the supply 50 by conduction of the transistor 51. Upon the application of a switching pulse to terminal 31, capacitor 34 being charged, switch 45 conducts and closes the circuit therethrough. The storage capacitor 34 is discharged through capacitor 40, and current flows over the electrical path including diode 62, switch 45, laser diode 30 and diode 37. The voltage drop across diode 62 reverse biases transistor 52, decoupling capacitor 34 from the supply 49. Upon capacitor 34 becoming discharged, the holding current through switch 45 is removed. The switching pulse applied to the gate 47 of switch 45 having terminated, switch 45 ceases conduction, and the circuit therethrough is opened. Capacitor 34 thereafter charges through transistor 52 for the next operation of switch 45. Upon the application of a switching pulse to the terminal 32, capacitor 35 being charged, switch 46 conducts. Storage capacitor 35 is discharged through capacitor 40, and current flows over the electrical path including diode 63, switch 46, laser diode 30, and diode 38. The voltage drop across diode 63 reverse biases transistor 51, decoupling capacitor 35 from the supply 50. After capacitor 35 is discharged, removing the holding current for the switch 46, switch 46 ceases conduction and the circuit therethrough is opened. Capacitor 35 thereafter recharges for the next operation of switch 46. It follows that accidental turn-on of both switches 45, 46 only results in discharging capacitors 34, 35 through the laser diode 30 rather than shorting the series connected voltage sources 49, 50 through the laser diode 30. Further, the operation of the circuit ensures that switches 45, 46 will open or become non-conducting following the application of a high current pulse therethrough to the laser diode 30.

There are two conflicting demands placed on the value of capacitance used for capacitor 34 and capacitor 35. First, it is desirable to make capacitor 34 and capacitor 35 as large as possible to reduce the power dissipation. The other demand is that it is desirable to make capacitors 34, 35 as small as possible to minimize the power dissipated in the laser diode in the event both switches 45 and 46 are turned on at the same time. It has been found that a practical compromise is to make the value of capacitor 34 equal to the value of capacitor 35 and the value of capacitor 40 equal to one tenth the value of either capacitor 34 or 35. Capacitors 34, 35 operate essentially as batteries for applying the operating pulses to the laser diode 30. Capacitor 40 determines the time constant of the pulse energy so applied or pulse duration. The value of capacitor 40 is determined so that the duration of the pulse applied to the laser diode 30 is long enough to ensure adequate output power from the laser diode 30 but not so long as to exceed the maximum power dissipation rating of the laser diode 30.

What is claimed is:

1. In combination:

first and second unidirectional current conducting devices connected in series across a load with unlike electrodes of said devices connected together, a voltage supply having a positive terminal and a negative terminal, a capacitor having one terminal connected to the junction of said first and second devices and its other terminal connected to the electrical midpoint of said voltage supply, and means for alternately connecting first said positive terminal of said voltage supply to one side of said load and then said negative terminal of said voltage supply to the other side of said load to cause said first and second devices alternately to conduct and direct current flow to charge and discharge said capacitor through said load.

2. A combination as claimed in claim 1 and wherein said load is an injection laser diode having an anode and a cathode and said devices are semiconductor diodes each having an anode and a cathode, the anode of said laser diode being connected to the cathode of said first diode and through said connecting means to said positive terminal, the cathode of said laser diode being connected to the anode of said second diode and through said connecting means to said negative terminal, the anode of said first diode being connected to the cathode of said second diode and to said one terminal of said capacitor.

3. In combination, first and second diodes connected in series across a load with unlike electrodes of said diodes connected together, a voltage supply having a first and second portion of equal potential connected in series whereby the positive terminal of said second portion is connected to the negative terminal of said first portion, a capacitor having one terminal connected to the junction of said first and second diodes and its other terminal connected to the junction of said first and second portions of said voltage supply, a first switch connected between the positive terminal of said first portion of said voltage supply and one side of said load, a second switch connected between the negative terminal of said second portion of said voltage supply and the other side of said load, and means for alternately switching said first and said second switches so that, when said first switch is closed and said second switch is open, said capacitor is charged to half the voltage of said source in one direction through said load and said first diode and, when said second switch is closed and said first switch is open, said capacitor is charged to half the voltage of said source in the opposite direction through said load and said second diode.

4. A combination as claimed in claim 3 and wherein said first and said second switches are silicon controlled rectifier switches and said first and said second diodes are semiconductor devices.

5. A combination as described in claim 3 and including means connected across said first and said second portions of said voltage supply for alternately decoupling said voltage supply from said load whenever the respective switches are closed.

6. A push-pull circuit for supplying high current, short duration pulses to a load comprising:

first and second diodes connected in series across said load with unlike electrodes of said devices connected together, a unidirectional voltage supply having a first and second portion of equal potential whereby the positive terminal of said second portion is connected to the negative terminal of said first portion, a first and second capacitor connected in series with the junction of said capacitors connected to the junction of said first and second portions of said voltage supply, a third capacitor connected between the junction of said first and second capacitors and the junction of said first and second diodes, an NPN transistor having a collector terminal connected to the positive terminal of said first portion of said voltage supply and an emitter connected to the open terminal of said first capacitor, a PNP transistor having a collector connected to the negative terminal of said second portion of said voltage supply and an emitter connected to the open terminal of said second capacitor, means for biasing said NPN transistor including a third diode connected between the emitter and base of said NPN transistor whereby said NPN transistor conducts and charges said first capacitor, means for biasing said PNP transistor including a fourth diode connected between the emitter and base of said PNP transistor whereby said PNP transistor conducts and charges said second capacitor, a first switch connected between said third diode and one side of said load, a second switch connected between said fourth diode and the other side of said load, and means for alternately switching said first and second switches so that, when said first switch is closed and said second switch is open said first capacitor discharges through said third diode reverse biasing said NPN transistor, decoupling said first portion of said power supply and charging said third capacitor in one direction through first diode and said load; and, when said first switch is open and said second switch is closed, said second capacitor discharges through said fourth diode reverse biasing said PNP transistor, decoupling said second portion of said power supply and charging said third capacitor in the opposite direction through said second diode and said load.

7. A circuit for supplying short duration, high current pulses to an injection laser diode comprising:

a laser diode having an anode and cathode, a second and third semiconductor diode each having an anode and cathode connected in series across said laser diode with the anode of said second diode connected to the cathode of said laser diode and the cathode of said third diode connected to the anode of said laser diode, a voltage supply having a first and second portion of equal unidirectional potential whereby the positive terminal of said second portion is connected in series with the negative terminal of said first portion, a first and second capacitor connected in series with the junction of said capacitors connected to the junction of said first and second portions of said voltage supply, a third capacitor connected between the junction of said first and second capacitors and the junction of said second and third semiconductor diodes, an NPN transistor having a collector terminal connected to the positive terminal of said first portion of said voltage supply and an emitter connected to the open terminal of said first capacitor, a PNP transistor having a collector connected to the negative terminal of said second portion of said voltage supply and an emitter connected to the open terminal of said second capacitor, means for biasing said NPN transistor including a fourth diode having an anode connected to the emitter and a cathode connected to the base of said NPN transistor whereby said NPN transistor conducts and charges said first capacitor from said first portion of said supply, means for biasing said PNP transistor including a fifth diode having a cathode connected to the emitter and an anode connected to the base of said PNP transistor whereby said PNP transistor conducts and charges said second capacitor from said second portion of said supply, a first silicon controlled rectifier switch having an anode connected to the cathode of said fourth diode and a cathode connected to said anode of said laser diode, a second silicon controlled rectifier switch having a cathode connected to the anode of said fifth diode and an anode connected to the cathode of said laser diode, and means for alternately gating said first and second switches so that, when said first switch conducts and said second switch is nonconducting, said first capacitor discharges through said fourth diode reverse biasing said NPN transistor thereby decoupling said first portion of said supply and charging said third capacitor in one direction through said second diode and said laser diode; and when said first switch is nonconducting and said second switch conducts, said second capacitor discharges through said fifth diode reverse biasing said PNP transistor thereby decoupling said second portion of said supply and charging said third capacitor in an opposite direction through said first diode and said laser diode.

References Cited

UNITED STATES PATENTS 3,305,733 2/1967 Jahn ............ 307—88.5

JAMES D. KALLAM, *Primary Examiner.*

J. D. CRAIG, *Assistant Examiner.*